(12) United States Patent
Asikainen et al.

(10) Patent No.: US 10,812,577 B2
(45) Date of Patent: Oct. 20, 2020

(54) METHOD, A SYSTEM AND A COMPUTER PROGRAM PRODUCT FOR DYNAMICALLY SCALING OPC UA SERVER CAPACITY

(71) Applicant: PROSYS OPC OY, Espoo (FI)

(72) Inventors: Jukka Asikainen, Helsinki (FI); Ismo Leszczynski, Espoo (FI); Jouni Aro, Espoo (FI)

(73) Assignee: PROSYS OPC OY, Espoo (FI)

( * ) Notice: Subject to any disclaimer, the term of this patent is extended or adjusted under 35 U.S.C. 154(b) by 0 days.

(21) Appl. No.: 16/896,269

(22) Filed: Jun. 9, 2020

(65) Prior Publication Data

US 2020/0304567 A1 Sep. 24, 2020

Related U.S. Application Data

(63) Continuation of application No. PCT/FI2018/050877, filed on Dec. 4, 2018.

(30) Foreign Application Priority Data

Dec. 22, 2017 (FI) ...................................... 20176152

(51) Int. Cl.
*H04L 29/08* (2006.01)
*H04L 29/06* (2006.01)
*G05B 15/02* (2006.01)

(52) U.S. Cl.
CPC .......... *H04L 67/1014* (2013.01); *G05B 15/02* (2013.01); *H04L 63/083* (2013.01); *H04L 63/0823* (2013.01); *H04L 67/42* (2013.01)

(58) Field of Classification Search
CPC ............. H04L 76/1014; H04L 63/0823; H04L 63/083; H04L 67/42; G05B 15/02
See application file for complete search history.

(56) References Cited

U.S. PATENT DOCUMENTS 8,234,384 B2 * 7/2012 Fisher ................. G06F 11/2025
709/227
8,341,270 B2 * 12/2012 Mazzaferri ............. H04L 67/16
709/227

(Continued)

FOREIGN PATENT DOCUMENTS

CN 107357272 A 11/2017
EP 2565740 A1 3/2013

(Continued)

OTHER PUBLICATIONS

Lee, S.J. et al. Development of a Smart Sensor System Using OPC UA. Proceedings of the 15th International Conference on Advances in Mobile Computing & Multimedia (MoMM2017): ACM, [online], Dec. 4, 2017, pp. 220-225, ISBN 978-1-4503-5300-7, [retrieved on Jun. 8, 2018]. Retrieved from <https://dl.acm.org/citation.cfm?id=3156475>, <DOI:10.1145/3151848.3156475> the whole document, in particular Fig. 3; Section 2.2.

(Continued)

*Primary Examiner* — Daniel C. Murray
(74) *Attorney, Agent, or Firm* — Robert P. Michal, Esq.; Carter, DeLuca & Farrell LLP

(57) ABSTRACT

A method, a system and a computer program product for dynamically managing address spaces performed by an OPC UA server. The OPC UA server is part of an OPC VA architecture network including a plurality of OPC UA servers, a plurality of OPC UA clients and a load balancer configured to redirect communication between the plurality of OPC UA servers and the plurality of OPC UA clients. The method includes receiving an incoming OPC UA client service request, checking if the address space is instantiated at the OPC UA server, and if the address space is not instantiated, dynamically creating the requested one of the plurality of address spaces at the OPC UA serve. A service (Continued)

response to the OPC UA client using the instantiated address space.

10 Claims, 6 Drawing Sheets

(56) References Cited

U.S. PATENT DOCUMENTS

| | | | | |
|---|---|---|---|---|
| 8,423,608 | B2* | 4/2013 | Mahnke | H04L 12/403 |
| | | | | 709/203 |
| 8,522,333 | B2* | 8/2013 | Leitner | G06F 21/41 |
| | | | | 726/8 |
| 8,549,065 | B2* | 10/2013 | Mahnke | G06F 9/466 |
| | | | | 709/203 |
| 9,210,100 | B2* | 12/2015 | Van Der Linden | G06F 9/5077 |
| 9,602,537 | B2* | 3/2017 | Petty | H04L 63/0823 |
| 9,667,743 | B2* | 5/2017 | Volkmann | H04L 67/32 |
| 9,854,027 | B2* | 12/2017 | Volkmann | G06F 9/542 |
| 10,146,217 | B2* | 12/2018 | Pauly | G06F 21/121 |
| 10,637,724 | B2* | 4/2020 | Johnson | H04L 67/141 |
| 2010/0306313 | A1* | 12/2010 | Mahnke | G06F 9/543 |
| | | | | 709/203 |
| 2011/0035792 | A1* | 2/2011 | Leitner | H04L 63/0815 |
| | | | | 726/8 |
| 2014/0006465 | A1* | 1/2014 | Davis | G06F 16/183 |
| | | | | 707/827 |
| 2014/0040431 | A1* | 2/2014 | Rao | G06F 16/2282 |
| | | | | 709/219 |
| 2015/0189003 | A1 | 7/2015 | Erlmann et al. | |
| 2016/0330816 | A1 | 12/2016 | Rajendran Fillai Sarojini et al. | |
| 2016/0380816 | A1* | 12/2016 | Rajendran Pillai Sarojini | H04L 41/0866 |
| | | | | 709/221 |
| 2017/0300042 | A1* | 10/2017 | Pauly | G05B 19/4186 |
| 2019/0306279 | A1* | 10/2019 | Singa | H04L 67/42 |

FOREIGN PATENT DOCUMENTS

| | | |
|---|---|---|
| RO | 128326 | 4/2013 |
| WO | 2016155856 A1 | 6/2016 |

OTHER PUBLICATIONS

Cupek, R. et al. Feasibility Study of the Application of OPC UA Protocol for the Vehicle-to-Vehicle Communication. In: Lecture Notes in Computer Science book series (LNCS, vol. 10449), International Conference on Computational Collective Intelligence (ICCCI 2017), Springer, Sep. 7, 2017, pp. 282-291, ISBN 978-3-319-67077-5, [retrieved on Jun. 14, 2018]. Retrieved from <https://link.springer.com/chapter/10.1007/978-3-319-67077-5_27>, <DOI:10.1007/978-3-319-67077-5_27> the whole document, in particular Fig. 3; Section 3.

OPC Foundation. OPC Unified Architecture Specification; Part 1: Overview and Concepts, Release 1.04. [online], Nov. 22, 2017, pp. 1-30, [retrieved on Jun. 27, 2018]. Retrieved from <https://opcfoundation.org/developer-tools/specifications-unified-architecture/part-1-overview-and-concepts/> the whole document, in particular Fig. 5; Sections 5.4.1.2, 6.3.

Ismail, A. et al. Coordinating redundant OPC UA servers. Conference: 2017 22nd IEEE International Conference on Emerging Technologies and Factory Automation (ETFA): IEEE, [online], Sep. 2017, [retrieved on Jun. 25, 2018]. Retrieved from <https://www.researchgate.net/publication/ <http://www.researchgate.net/publication/>322320852_Coordinating_redundant_OPC_UA_servers>, <DOI:10.1109/ETFA.2017.8247568> the whole document, in particular Fig. 1; Sections 2B, 3A, 4A.

Finnish Search Report issued by the Finnish Patent and Registration Office in relation to Finnish Application No. 20176152 dated Jun. 29, 2018 (3 pages).

International Search Report issued by the European Patent Office acting as the International Searching Authority in relation to International Application No. PCT/FI2018/050877 dated Feb. 27, 2019 (4 pages).

Written Opinion of the International Searching Authority issued by the European Patent Office acting as the International Searching Authority in relation to International Application No. PCT/FI2018/050877 dated Feb. 27, 2019 (5 pages).

International Preliminary Report on Patentabililty issued by the International Bureau of WIPO in relation to International Application No. PCT/FI2018/050877 dated Jun. 23, 2020 (6 pages).

* cited by examiner

Prior Art

METHOD, A SYSTEM AND A COMPUTER PROGRAM PRODUCT FOR DYNAMICALLY SCALING OPC UA SERVER CAPACITY

CROSS-REFERENCE TO RELATED APPLICATIONS

This application is a continuation of PCT International Patent Application No. PCT/FI2018/050877 filed Dec. 4, 2018, which claims the benefit of Finnish Patent Application No. 20176152, filed Dec. 22, 2017, the disclosure of each of these applications are expressly incorporated herein by reference in their entireties.

FIELD

The present invention relates to a method, a system and a computer program product related to machine to machine communication. More particularly, the present invention relates to an improvement of OPC UA machine to machine communication system that enables increasing OPC UA server resources dynamically.

BACKGROUND

The OPC Unified Architecture (OPC UA), released by OPC Foundation in 2008, is a platform independent, service-oriented, machine to machine communication protocol architecture for industrial automation. The architecture is independent of hardware and operating system platform. OPC UA focuses on facilitating communication of industrial equipment and systems for data collection and control. OPC UA provides the infrastructure for interoperability across the enterprise, from machine to machine and from machine to enterprise, Such standardized communication enables building industrial systems with communication towards and between machines from different manufacturers.

OPC UA offers an integral information model, which is the foundation of the infrastructure necessary for information integration. With OPC UA, vendors and organizations can model their complex data into an OPC UA address space, taking advantage of the rich service-oriented architecture. Some exemplary, but non-limiting, industries applying OPC UA in their operations include pharmaceutical, oil and gas, building automation, industrial robotics, security, manufacturing and process control.

The OPC UA protocol can be used to exchange information over OPC TCP or OPC HTTPS connections using compliant networks, such as Local Area Network (LAN) or the Internet.

The dominant OPC UA information exchange model is that of a client/server-model, where OPC UA clients (OPC-C) initiate connections to the OPC UA servers (OPC-S) and read, write or browse the contents of the OPC UA Address Space (AS). OPC UA clients send OPC UA service requests to which the OPC UA servers respond with corresponding OPC UA service responses. Connections are established as sessions between OPC UA clients and OPC UA servers. The sessions are maintained by keep-alive messages until the closing of the connection. OPC UA is a session-oriented architecture. OPC UA sessions establish socket to socket connections between OPC UA clients (OPC-C) and OPC UA servers (OPC-S). An OPC UA server represents a single socket, which all OPC UA clients make connections to.

The OPC UA address space, later also referred in short as the address space (AS), is comprised of OPC UA nodes in a mesh network-like structure, where each node can represent, for example, a device, a type of a device, a measurement of a device, or a folder for other nodes. Each node in the address space can have one or more references to other nodes in the address space, or to nodes on other servers, without any hierarchical requirements. The address space often resembles in practice a typical tree-like file system, but the OPC UA specification doesn't define any fixed reference structure. The address space can be browsed by OPC UA clients, an operation which returns the node references of a specified node to the OPC UA client. The browsing operation typically follows the references of nodes, allowing the OPC UA client to navigate the address space in a way that is intended by the OPC UA server provider.

Traditionally, the generation of the OPC UA address space is hard coded into the OPC UA server and the address space does not change in respect to the OPC UA clients interacting with the OPC UA server. The OPC UA information model is a so-called Full Mesh Network based on nodes. These nodes can include any kind of meta information, and are similar to the objects of object-oriented programming. Nodes hold process data as well as any other types of metadata. An OPC UA client may directly refer to a specific node address when it wishes to interact with a specific node. On the other hand, if the exact address of the desired target node is not known in advance, the mesh network structure allows searching for a specific node by navigating the node references of each node until the desired node has been found.

OPC UA clients connecting to OPC UA servers are authenticated by the OPC UA servers using X.509 application certificates and user identity information, which includes either a username/password combination, or a personal X.509 identification certificate. OPC UA servers are authenticated by the OPC UA clients by the server X.509 certificates. Both parties need to trust each other for the OPC UA sessions to be established.

As known in the art, a software container, a container in shoat, is a lightweight, stand-alone, executable package of a piece of software that includes everything needed to run it: code, runtime, system tools, system libraries and settings. Containers isolate software from its surroundings, allowing the software to be run in the intended way regardless of the environment that is hosting the container.

DESCRIPTION OF THE RELATED ART

The number of the OPC UA client sessions to a single OPC UA server can be staggering. The computing resources of an OPC UA server can be increased, but this will remedy the situation only to a point. At some point the single socket connection will cease to function due to the necessary locking mechanisms for the socket, which keeps the client sessions isolated in OPC UA server implementations. For instance, an OPC UA server acting as a gateway to a central data warehouse needs to handle a very large amount of client sessions effectively.

Patent application publication US20160380816 A1 discloses a data access configuration system, in which a configuration tool is used for performing a configuration function.

A solution is therefore needed that enables scaling of OPC UA server resources.

SUMMARY

An objective is to provide a method and apparatus so as to solve the problem of improving scalability of OPC UA server resources. The objectives of the present invention are achieved with a method according to the claim 1. The objectives of the present invention are further achieved with system according to the claim 9 and with a computer program product according to the claim 10.

The preferred embodiments of the invention are disclosed in the dependent claims.

The invention deals with the scaling of OPC UA server resources in an automated and general fashion, providing a substantial improvement to the situation apparent in most OPC UA client/server-model implementations.

An OPC UA server is an apparatus complying with the OPC UA standard specifications. An OPC UA server may be implemented as a software or as a software container running on a physical or a virtual server, or in a cloud computing environment. An OPC UA server answers to OPC UA service requests with the corresponding OPC UA service responses as specified in the OPC UA specification. An OPC UA client is a client apparatus complying with the OPC UA standard specifications.

According to a first aspect, a method of dynamically managing address spaces performed by an OPC UA server is provided. The OPC UA server is part of an OPC UA architecture network comprising a plurality of OPC UA servers, a plurality of OPC UA clients and a load balancer configured to redirect communication between the plurality of OPC UA servers and the plurality of OPC UA clients. The method comprises receiving an incoming OPC UA client service request, wherein the incoming OPC UA client service request comprises client credentials of the OPC UA client, and wherein at least one of the client credentials define one of a plurality of address spaces provided by the background system. The method further comprises checking if the address space is instantiated at the OPC UA server, and if the address space is not instantiated, dynamically creating the requested one of the plurality of address spaces at the OPC UA server.

The method further comprises sending a service response to the OPC UA client using the instantiated address space.

According to a second aspect, the dynamically creating the address space comprises sending an address space request to the background system and receiving address space information from the background system.

According to a third aspect, the dynamically creating the address space comprises accessing information pre-stored at the OPC UA server for determining the address space.

According to a fourth aspect, the method is performed during a session established between the OPC UA server and the OPC UA client.

According to a fifth aspect, the OPC UA client credentials comprise an application certificate and a user identity, and the user identity comprises at least one of a personal authentication certificate and a combination of a username and password.

According to a sixth aspect, each of the plurality of address spaces is configured to serve a particular type of OPC UA clients.

According to a seventh aspect, the at least one of the client credentials define the address space configured to serve a particular type of OPC UA clients.

According to an eighth aspect, the method further comprises starting a new OPC UA server, wherein the new OPC UA server has no address spaces instantiated and establishing a session with the OPC UA client prior to receiving the incoming OPC UA client service request.

According to another aspect, a system comprising a plurality of OPC UA servers, a plurality of OPC UA clients and a load balancer configured to redirect communication between the plurality of OPC UA servers and the plurality of OPC UA clients is provided. Each of the plurality of OPC UA servers in the system are configured to perform the method according to the above aspects.

According to a yet another aspect, a computer program product having instructions which when executed by a computing device or a system, cause the computing device or system to perform a method of dynamically managing address spaces is provided. The method comprises steps of the method according to any of the above aspects.

The present invention is based on the idea of introducing a plurality of identical OPC UA server instances in a network, which are capable of dynamically generating address spaces, and sharing the load between OPC UA servers using a load balancer (LB) running in the same network. The term OPC UA server refers to, in this context, an independent OPC UA server which is capable of serving information to any OPC UA clients. All OPC UA servers related to the invention are basically identical by functionality and by capacity. Containers may be used to handle the OPC UA servers. With the use of containers, scaling can be achieved in a general manner in many domains.

In the following description, terms server and OPC UA server may be used in exchange. Terms client and OPC UA client may be used in exchange.

The term application certificate refers to a certificate used for application authentication in the OPC UA architecture. A personal authentication certificate is used to identify users of said applications. A personal authentication certificate may identify a client or a server. The current OPC UA specification uses only X.509 certificates, but the invention is applicable to any future additions to the supported certificate technologies.

The load balancer preferably redirects each new OPC UA client session to the OPC UA server with the least amount of sessions. Alternative load balancing methods may be used, such as round robin distribution of new client sessions, but these typically provide inferior performance. To keep the sessions intact, the load balancer redirects all OPC UA client requests from the same OPC UA client instance to the same OPC UA server instance, as long as the session between them is active.

The number of instantiated OPC UA servers is managed by the load balancer. When the load to any single OPC UA server exceeds its capabilities, a new OPC UA server may be created and taken in to use. If an OPC UA server doesn't have any active sessions, the server may be removed, and its resources freed.

In order to make an OPC UA server scalable by increasing the number of instantiated OPC UA servers, each OPC UA server instance needs to have functionalities and capabilities identical to each other. The present invention has the advantage that the OPC UA servers with mutually identical functionality may serve any OPC UA clients requesting services in any address space defined in the industrial background system. The load balancing task can be performed efficiently, since any incoming session request from any OPC UA client can be forwarded to any of the available OPC UA server instances, as each OPC UA server is capable of serving all OPC UA clients.

The functionalities of OPC UA servers are identical to each other if each server is able to serve the same data in an identical way from the same background system based on the requesting clients' type. However, the address spaces provided by the otherwise identical OPC UA servers do not need to be identical, but these may be changed dynamically.

As noted before, OPC UA clients can be identified and classified using application certificates and/or user identities. User identities comprise either username and password combinations, or client's personal authentication certificates. A combination of an application certificate and a user identity may be referred to as client credentials. The term OPC UA client type, client type in short, refers to classification of the OPC UA client based on at least one of the client credentials or the combination thereof.

A benefit of the invention is that it ensures smooth scaling of the functionality provided by multiple OPC UA servers.

A further benefit of the invention is the possibility of making use of generally available orchestration tools to fulfil zero downtime requirements. The invention allows automatic addition of new OPC UA servers to existing OPC UA server deployments based on capacity requirements, without affecting prior connections or operations.

BRIEF DESCRIPTION OF THE DRAWINGS

In the following, the invention will be described in greater detail with reference to preferred embodiments while referring to the attached drawings, in which.

DETAILED DESCRIPTION

Figure 1:
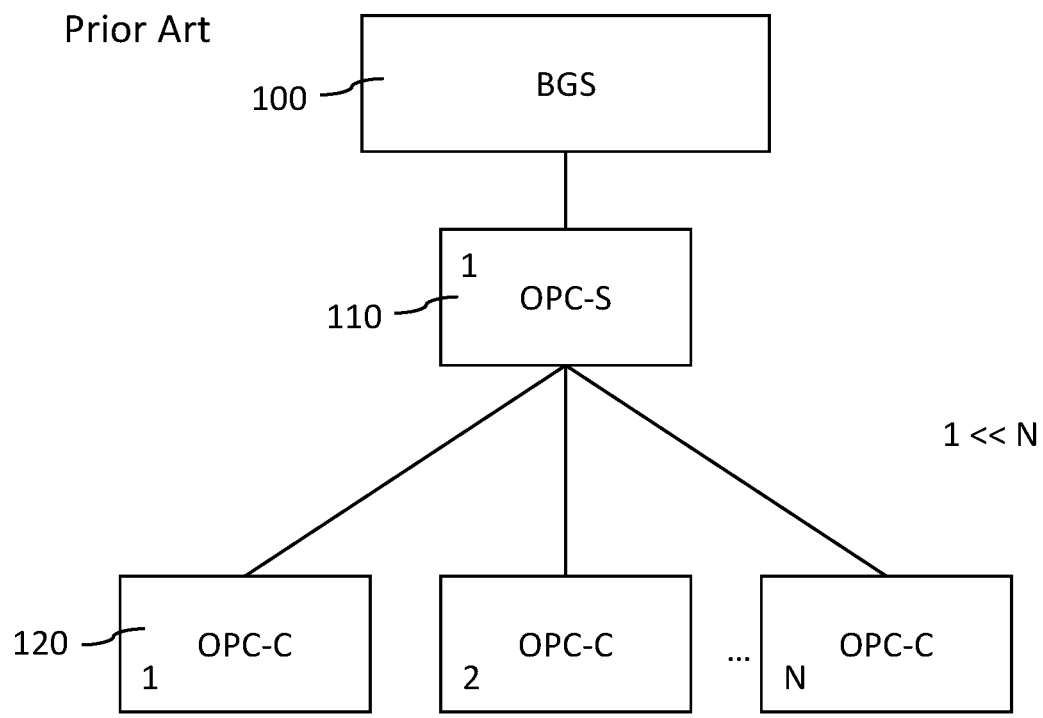
FIG. 1 illustrates the main OPC UA system elements and communication links between them according to the prior art.

FIG. 1 illustrates the main elements of a system according to the standardized OPC UA architecture as known in the art.

A single OPC UA server OPC-S (110) carries the sole responsibility of communication towards a background system BGS (100) for a plurality of OPC UA clients OPC-C (120). The address space provided by the OPC UA server (110) enables the OPC UA clients to interact with any node in the background system BGS.

In the following description, the term server refers to an OPC UA server/OPC UA server instance, the term client refers to an OPC UA client and the term service request refers to an OPC UA service request.

All communication from clients (120) is directed towards the single server (100) serving the entire address space to all clients (120). This is a working solution for a small to medium number of client sessions, or for a small enough load imposed on the server (110).

Figure 2:
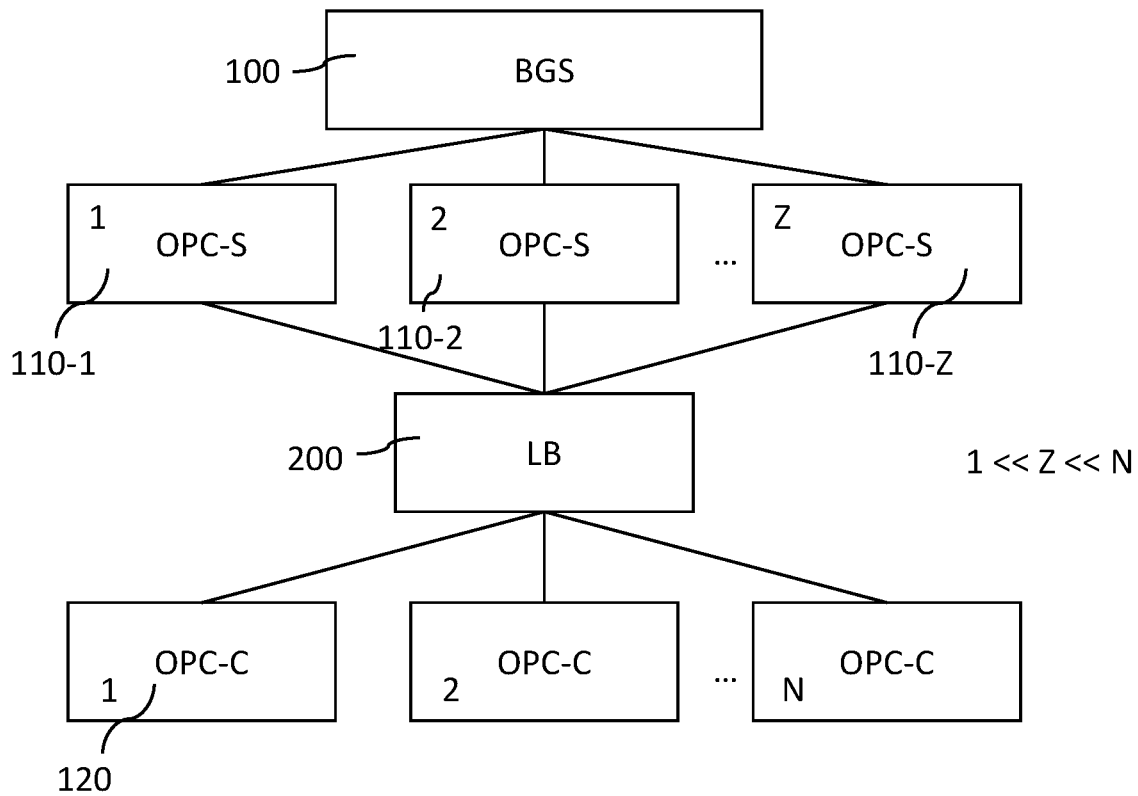
FIG. 2 illustrates the main OPC UA system elements and a load balancer architecture according to a first example.

FIG. 2 illustrates the main OPC UA system elements and a load balancer architecture according to a first example enabled by the invention. A plurality of servers (110-1, 110-2, ..., 110-Z) serve the same background system (100) to N clients (120). In a typical OPC UA system, the amount N of clients (120) is greater than the amount Z of the servers (110), where N and Z are positive integers.

A client (120) sends an OPC UA session service request to the load balancer LB (200) instead of a server (110-1, 110-2, ..., 110-Z). The address of the load balancer (200) appears to the client (120) as if it was a single OPC UA server. When the service request is received by the load balancer (200), the load balancer (200) selects one of the available servers (110) and redirects the request to the selected server (110-1, 110-2, ... 110-Z). The response from the selected server (110-1, 110-2, ..., 110-Z) is returned via the load balancer (200) to the client (120) and a session is established between the client (120) and the selected server (110). For the lifetime of the established session, all OPC UA service requests from the client (120) go to the same, initially selected, server (110) via the load balancer (200).

The load balancer (200) is transparent from the point of view of both the clients (120) and the servers (110). In other words, the client (120) does not know that the server it sends service requests to is actually a load balancer (200). Likewise, the server (110) does not know that it sends service responses to a load balancer (200) rather than a client (120). The transparent load balancer allows both the client (120) and the server (110) to operate using the normal, standardized OPC UA protocol.

The load balancer (200) acts as a transparent router between the clients and the servers in all situations, including session establishment, session operations and session termination. The clients cannot connect directly to a server behind the load balancer. The load balancer (200) does not have any knowledge of the content of the communication it routes.

The load balancer may support at least one of the communication protocols defined in the OPC UA standard, namely OPC TCP and OPC HTTPS. However, the load balancer is preferably capable of supporting any TCP communication.

Figure 3:
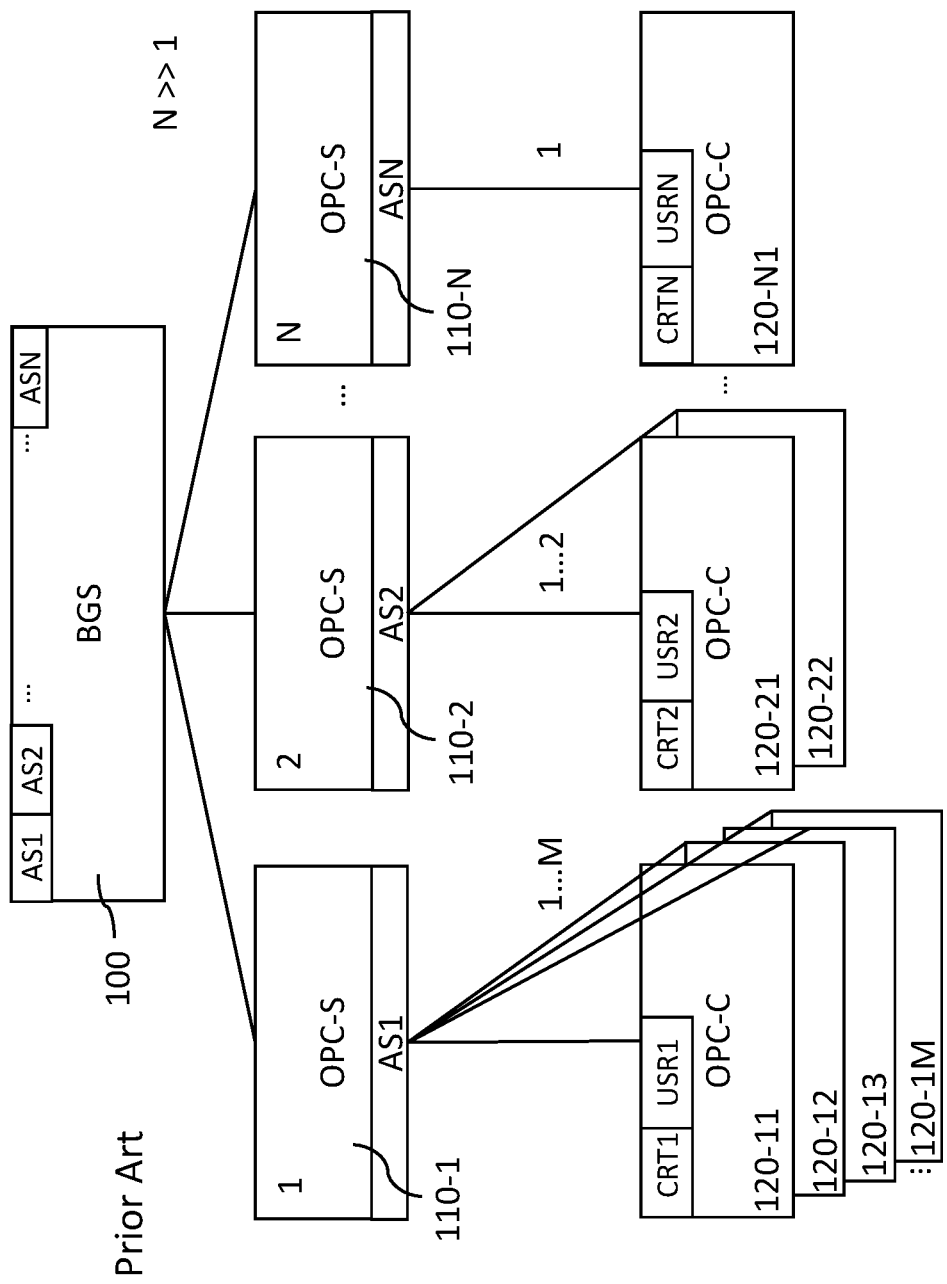
FIG. 3 shows an exemplary OPC UA system with multiple client types connecting to multiple servers according to the prior art.

FIG. 3 illustrates another example of OPC UA architecture as known in the art.

The system comprises N different servers (110-1, 110-2, 110-N), which serve the same background system (100) to the clients (120). The background system (100) provides multiple address spaces (AS1, AS2, ..., ASN). Each address space is configured to serve one specific client type.

In this example, a plurality of clients (120) are divided into N different client types illustrated in FIG. 3 as groups of 1 to N clients. Each client type may comprise multiple independent clients. OPC UA architecture does not, as such, define any client types, but the presented client type grouping is based on the address space (AS1, AS2, AS3, ASN) for which the specific clients send service requests. In this example, the plurality of clients of client type 1 comprises a total of M clients (120-11, 120-12, 120-13, ..., 102-1M) that request service for address space 1 (AS1), the plurality of clients of client type 2 comprises two clients (121-21, 120-22) that request service for address space 2 (AS2), and the plurality of clients of client type N comprise one client (120-N1) that requests service for address space N (ASN). The example is non-limiting, so any of the N different client types may comprise M clients, where M and N are positive integers. Each client is identified with client specific credentials, which comprise at least one of the application certificate (CRT) and the user identity (USR).

This example shows a typical solution for increasing server computing resources. In this case, N servers (110-1, 110-2, ..., 110-N) are provided, each serving a single, specified address space (AS1, AS2, ASN). In other words, all OPC UA sessions from a specific client type are established to the respective, single server providing the correct address space. The single socket mechanism used in the OPC UA architecture enforces hard limits to the ultimate number of sessions that can be handled by a single server, and there is no automatic way to solve the problem when the server runs out of resources. If the hard limit of manageable sessions is reached, manual measures dependent upon the details of the case need to be taken in order to remedy the situation.

In the system illustrated in FIG. 3, in which each server serves only a defined portion of the entire address space of the background system, each client type needs to know which server has the correct address space for it (120-1, 120-2, . . . , 120-N) in order to send their service requests to the correct server. If the client sends its request to a wrong server, and the server is properly configured, the session may be rejected. Alternatively, the session is established, but as the server is wrong, the client does not find any data intended for it at the server. In the worst case the client may even be able to access information not intended for that client type. This kind of error situations are also avoided with the current invention.

Figure 4:
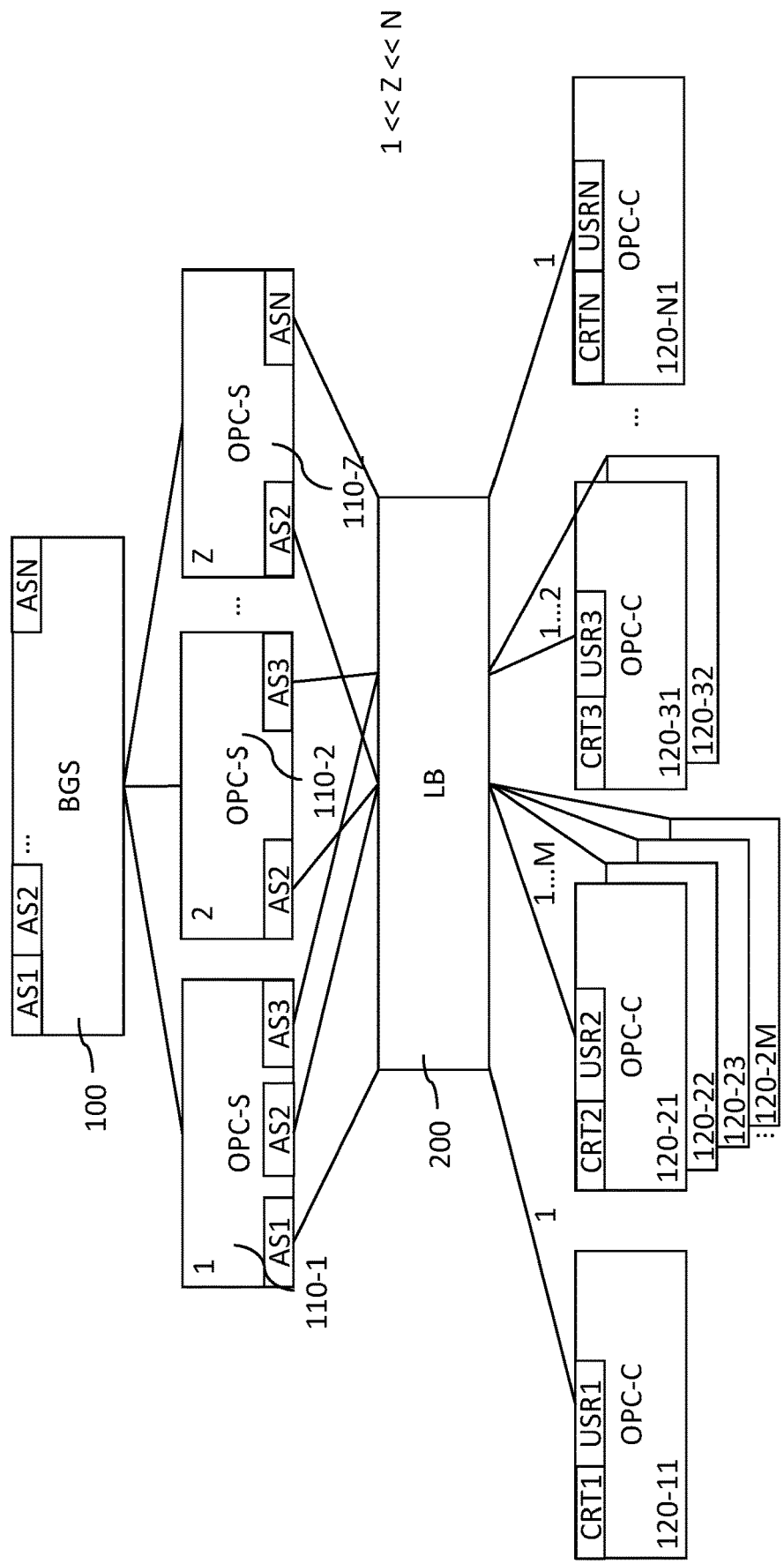
FIG. 4 shows an exemplary OPC UA system with multiple client types connecting to multiple servers according to a second example.

FIG. 4 illustrates an OPC UA network architecture according to a second example. In FIG. 4, a client (120) of any client type sends its OPC UA service request to the load balancer (200), which then redirects the request to one of the servers. Preferably, the service request is sent to a server (110-1, 110-2, . . . , 110-Z) which currently serves the least amount of sessions or has the most processing capacity available. If the selected server (110-1, 110-2, . . . , 110-Z) does not have the correct address space available for the connecting client type, the relevant address space is dynamically generated by the server (110-1, 110-2, . . . , 110-Z) when the session is established.

The load balancer may select any server solely based on the session load of the servers (110-1, 110-2, . . . , 110-Z), since all server instances are identical to each other by functionality and each server instance is capable of serving all address spaces (AS1, AS2, . . . , ASN) provided by the background system (100). As a result, any of the servers may serve any number of different client types and provide any of the requested address spaces. In practice, the number of address spaces provided by a single server instance may vary between 1 to N, where N is the integer number of different address spaces and/or the number of different client types.

The response from the selected server is returned to the client by the load balancer in similar manner as in the first example.

There are two possible ways to manage the dynamical generation of address spaces in the servers (110-1, 110-2, . . . , 110-Z). The address spaces may be generated with the support of a mechanism in the background system, where the plurality of address spaces is stored. Information exchange between the server and the background system may be achieved via application programming interfaces (API), which may provide access to various resources and systems. Examples of API accessible resources are for example data stores, such as databases, and authentication services. Using API methods, the client credentials can be passed by the server to the background system in a form the background system understands them, and the returned results are used to generate the address space at the server. Each address space node contains a namespace URI and an identifier, a combination of which is unique. Each node can have references to any other nodes meaningful to its operation. Each node also has attributes containing the relevant metadata and, for instance, process data.

Alternatively, the dynamic generation of the address spaces may be implemented within the server itself, without requirement for any direct connection to the underlying background system for this purpose. In this case, the information for determining the correct address space for a certain client type has to be pre-stored at the server in a configuration file or some other similar storage. The pre-stored information may be for example a local database at the server, or a hard-coded mapping that unanimously defines the relationship between the client credentials and the address space nodes. This storage will also need to contain the necessary address space information as in the previous case. In response to the server noticing that an address space needed for a client of an incoming service request is not readily established, it may then dynamically generate the address space.

In this exemplary embodiment, the number of servers (110-1, 110-2, . . . , 110-Z) does not depend on the number of address spaces as in the prior art. Rather, the number of servers may be dynamically changed based on the system load so that none of the servers are pushed to or over their capacity limits in terms of the number of sessions they serve.

Isolation of server instances allows use of containers in the handling of the server instances, which improves the general scaling and replication capabilities of the system. As known in the art, containers isolate software from its surroundings, allowing the software to be run in the intended way regardless of the environment that is hosting the container. Using containers, a server instance may be implemented as a cloud computing service.

When the current server base serving a specific background system appears to approach its capacity limit, the load balancer may instantiate a new server instance. Thus, the load balancer ensures the availability of sufficient number of server instances for all the ongoing sessions. Strategies for optimal amount of server instances can include simply monitoring the central processing unit (CPU) load or the memory consumption of the server instances or both. For instance, when a server or the currently deployed server base goes over 80 percent of the maximum CPU used, a new server instance will be created.

Figure 5:
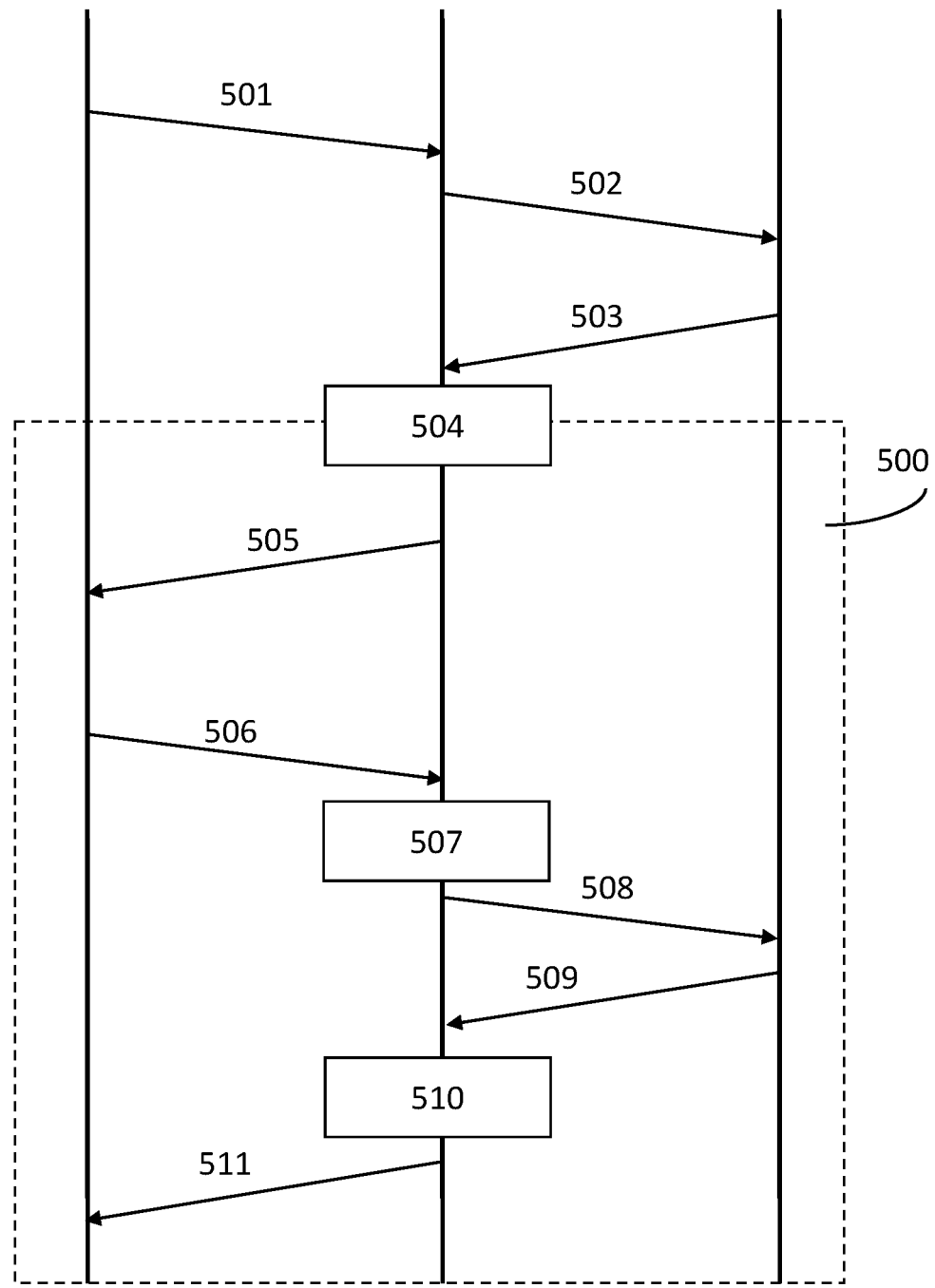
FIG. 5 illustrates an exemplary signaling diagram of an embodiment.

FIG. 5 shows an exemplary signaling diagram illustrating an embodiment of dynamic address space generation in a server (OPC-S).

In the embodiments of the invention, all service requests between the client and the server are routed by the load balancer, which is not shown in the signaling diagram, since the load balancer does not have any active role regarding the actual content of the signaling. When load balancing is used, the client does not know which server receives its request. Instead, the load balancer decides which server (OPC-S) receives the service request.

The client (OPC-C) is first authenticated. The authentication is performed as defined in the OPC UA specifications.

The client (120) sends a session create service request (501) to a server (OPC-S) as defined in the OPC UA standard. This service request comprises client credentials. These client credentials comprise at least one of an application certificate and a user identity. A user identity comprises either a username and password combination, or a personal authentication certificate. For secure connections, use of the personal authentication certificate is preferred for identification of the user. On the other hand, a username and password combination is easier to change, which increases flexibility.

The server (110) uses the background system (100) to validate the received client credentials. Thus, the server sends the credentials data to the background system (BGS) in an API call (502).

The background system receives the client credentials from the server, and either accepts or rejects the client credentials. Depending on the acceptance, the background system sends either a rejecting (not shown), or an accepting response (503) back to the server.

The server receives the response from the background system. If the response indicates acceptance of the credentials, the server creates (504) the requested session for the client, and sends a session created response (505) to the client. The session (500) is thus established. If the response from the background system rejects the request, no session is created, and the server rejects the session creation request from the client by sending security error response.

The client then receives either the session created service response (505) or the session rejected error service response (not shown). If the session created service response (505) is received, the session (500) is maintained until expressly closed. If the session rejected error service response is received, no session is established, and no further communication is possible without another session create service request from the client.

After the session has been created between the client and the server, the client is ready to interact with the server.

During an existing session (500), the client sends a service request (506) to the server using the OPC UA session created in the phase (504). The service request can be, for example, a request to read values from nodes or a request to browse the address space.

When the server receives the service request (506) from the client, the server checks (507) whether the address space for the client type is already instantiated. In case the appropriate address space is not instantiated on the server, the address space information needs to be requested from the background system.

In this example, the server does not have pre-stored information for determining the correct address space for a client type. Thus, the server requests (508) address space information from the background system using the client type. The background system uses the client type to determine which address space corresponds to the given client type. Information exchange between the server and the background system may be achieved via application programming interfaces (API), which may provide access to various resources and systems. Examples of API accessible resources could be data stores, such as databases, or authentication services. When the background system receives the client type in the address space request, it responds with the relevant address space information (509) for that specific client type. As examples of the aforementioned API calls, the information exchange between the server and the background system may comprise database calls, SDK calls or any other library calls.

In response to the server receiving the address space information (509) from the background system, the server instantiates (510) a new address space for the client type.

If the server does not have the address space needed for the requesting client type instantiated, but the server already has pre-stored information for determining the correct address space for a client type, it may instantiate the needed address space without communication with the background system. In such case, information exchange (508, 509) with the background system may be omitted, since the server only needs to access the pre-stored information for instantiating the needed address space in the phase 510.

In case the check (507) indicates that the server already has instantiated the address space for the client type in the service request, the communication (508, 509) with the background system as well as the instantiation of the new address space (510) may be omitted. In other words, if the address space needed for responding to the service request (506) for the client type is already instantiated, the existing address space is used for generating the response.

The server sends a service response (511) back to the client with the requested information, and the client then receives the service response from the server.

Figure 6:
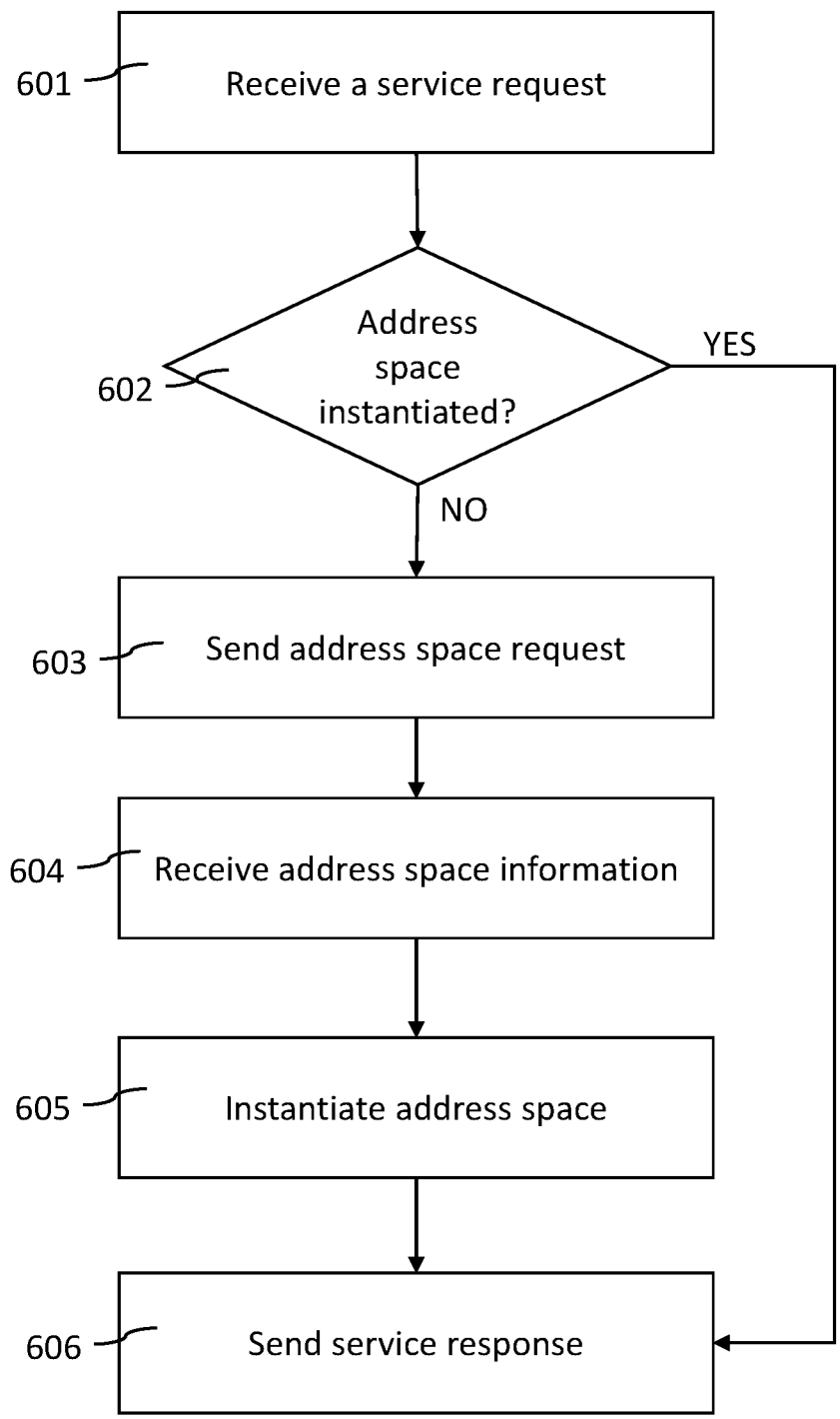
FIG. 6 illustrates a flow chart of a method of dynamic address space generation according to an embodiment.

FIG. 6 further illustrates the method for dynamical generation of address space performed by the OPC UA server during an ongoing session established with an OPC UA client according to an embodiment of the invention.

In phase 601, the server receives a service request from the client. According to the OPC UA specifications, part 4, Services, release 1.04, the service request has a RequestHeader, which contains among other things authenticationToken and requestHandle. Authentication token has a secret verifying the association of the request with an established session. Request handle identifies the request for the client and is returned to the client in the service response associated with the service request. Service request also contains necessary parameters for the type of service request.

In phase 602, the server checks whether an address space is already instantiated for the client type that established the session. The client type is identified from the client credentials provided when the session was created between the client and server.

If the server does already have the relevant address space instantiated for this client type, it may proceed directly to phase 606.

If the server does not have the relevant address space instantiated, it sends a request for the address space information to the background system in phase 603. The address space request comprises the client type, which is used by the background system to determine the appropriate address space. The address space request may further comprise further information, for example further identification information. For example, the further identification information may comprise a product name, which may be needed by the background system to determine the address space. Need for such further information is dependent on the implementation.

After the background system has processed the address space request, the server receives the address space information response in phase 604.

In response to receiving the address space information from the background system, the server instantiates the address space for the requesting client type in phase 605. After the instantiation is completed, the address space is ready to be used for responding to any service requests made by clients of the same client type.

In phase 606, the server sends a service response to the client using the instantiated address space. According to the OPC UA Specification Part 4: Services, release 1.04, the service response has a ResponseHeader, which contains among other things requestHandle and serviceResult. Request handle is the handle received by the client in the associated service request. Service result contains the status code of the operation, which informs whether the service request was fulfilled, or whether an OPC UA specific error occurred. The service response also includes necessary parameters for the type of the service response.

Figure 7:
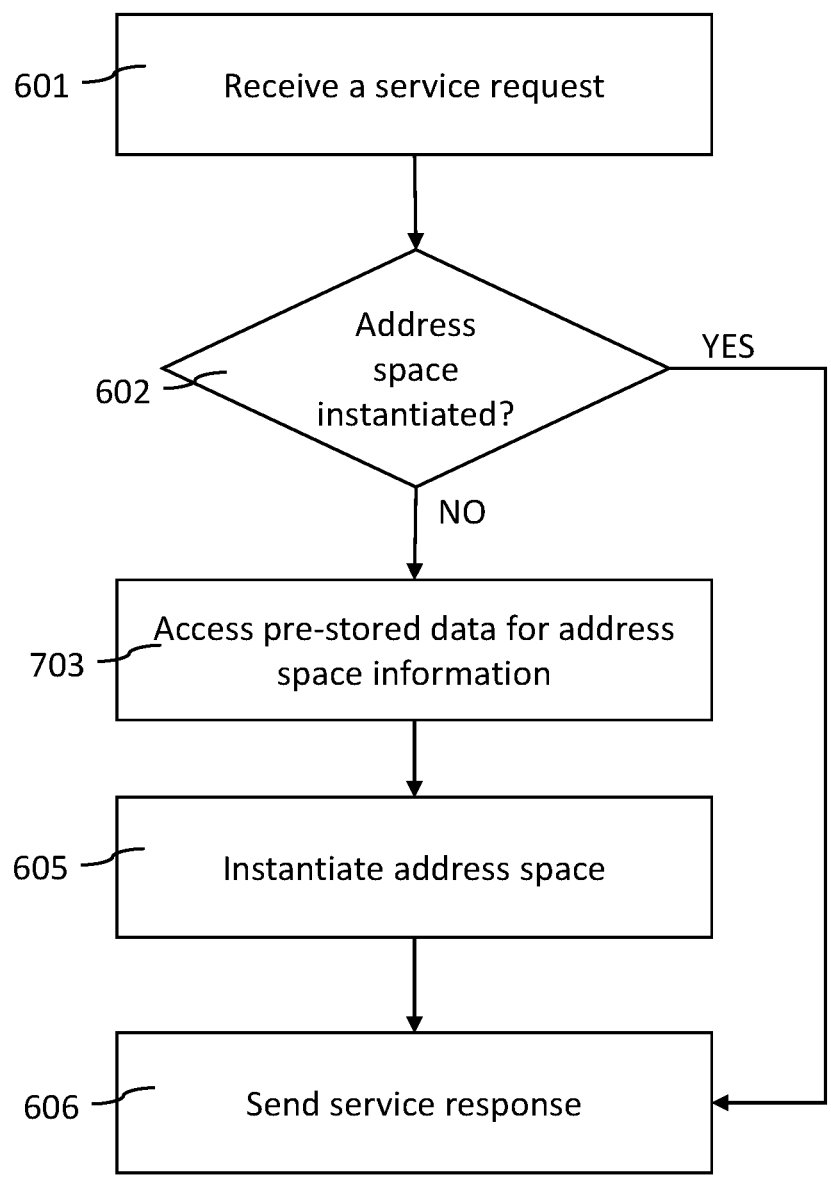
FIG. 7 illustrates another flow chart of a method of dynamical generation of address space according to an embodiment.

FIG. 7 illustrates another version of the method for dynamical generation of address space performed by the OPC UA server during an ongoing session established with an OPC UA client according to an embodiment of the invention.

In phase 601, the server receives a service request from the client.

In phase 602, the server checks whether an address space is already instantiated for the client type that established the session. The client type is identified from the client credentials provided when the session was created between the client and server.

If the server does already have the relevant address space instantiated for this client type, it may proceed directly to phase 606.

If the server does not have the relevant address space instantiated, it accesses pre-stored data available at the server or at a data storage available to the server in phase 703. The address space information may be identified based on the client type. Based on the accessed address space information, the server instantiates the address space for the requesting client type in phase 605. After the instantiation is completed, the address space is ready to be used for responding to any service requests made by clients of the same client type.

In phase 606, the server sends a service response to the client using the instantiated address space.

A first practical example of a system in which the invention may be applied is an IoT (Internet of Things) device in a large plant. The IoT device needs to know its configuration parameters from a central data warehouse of the plant. The IoT device uses an OPC UA client with preconfigured credentials to fetch the necessary parameters from an OPC UA server every 10 seconds. The OPC UA server represents the central data warehouse, which can reside in another part of the plant network or in a cloud computing environment. For security reasons, the single IoT device should only have access to a minimal part of the whole data warehouse address space.

An address space is generated specifically for each type of an IoT device, where each JOT device type has certain OPC UA client credentials. At least one of the client credentials provided by the IoT device are used to determine its type on the server. By applying the invention, the same OPC UA server implementation can be utilized in multiple OPC UA server instances to serve a huge amount of different OPC UA clients. The dynamic address space generation ensures that each OPC UA server instance may serve any type of OPC UA client without the need to pre-instantiate the entire, huge address space of the data warehouse in every OPC UA server instance. Also, the need for knowledge of a specific server configured to serve a specific address space, as seen in the prior art system in FIG. 3, is avoided. Thus, the OPC UA servers can be load balanced to serve requests from a very large amount of IoT devices.

A second practical example of a system in which the invention may be applied relates to a global company that has multiple manufacturing plants in different countries. Each plant sends and receives analysis values for its optimal operation from a company-wide analysis platform, which is the background system. The analysis platform is hosted by a global computing cloud provider for high availability and cost-efficient maintainability. The analysis platform communicates to the plants through a plurality of OPC UA server instances.

Each plant has an OPC UA client that writes the plant data to the analysis platform and reads the plant-specific analysis results. A single plant should only have access to the analysis results intended for that plant.

An OPC UA client with specific credentials is used to send and fetch the analysis data from an OPC UA server in the cloud computing environment. The OPC UA server serving an OPC UA client generates the address space specifically for the OPC UA client type. Thus, only the plant specific address space is exposed to any single plant client. Also, the same OPC UA server implementation can be used to serve requests for the all the plants in the company. In this scenario the OPC UA server is used in a load balanced environment.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method of dynamically managing address spaces performed by an Open Platform Communications Unified Architecture (OPC UA) server, wherein the OPC UA server is part of an OPC UA architecture network comprising a plurality of OPC UA servers and a plurality of OPC UA clients, the method comprises:

receiving an incoming OPC UA client service request; and sending a service response to the OPC UA client as a response to the OPC UA client service request;

wherein the OPC UA architecture network further comprises a load balancer configured to redirect communication between the plurality of OPC UA servers and the plurality of OPC UA clients, wherein the incoming OPC UA client service request comprises client credentials of an OPC UA client sending the OPC UA client service request, and the method further comprises:

identifying a client type from at least one of the client credentials, wherein the client type identifies one of a plurality of address spaces provided by a background system;

checking if the address space is instantiated at the OPC UA server for the identified client type;

in response to detecting that the address space is not instantiated for the identified client type, dynamically instantiating the requested one of the plurality of address spaces at the OPC UA server; and sending the service response to the OPC UA client using the dynamically instantiated address space.

2. The method according to claim 1, wherein the dynamically instantiating the address space comprises:

sending an address space request to the background system; and receiving address space information from the background system.

3. The method according to claim 1, wherein the dynamically instantiating the address space comprises:

accessing information pre-stored at the OPC UA server for determining the address space.

4. The method according to claim 1, wherein the method is performed during a session established between the OPC UA server and the OPC UA client.

5. The method according to claim 1, wherein the OPC UA client credentials comprise an application certificate and a user identity, and wherein the user identity comprises at least one of a personal authentication certificate and a combination of a username and password.

6. The method according to claim 1, wherein each of the plurality of address spaces is configured to serve a particular type of OPC UA clients.

7. The method according to claim 1, wherein the at least one of the client credentials define the address space configured to serve a particular type of OPC UA clients.

8. The method according to claim 1, wherein the method further comprises, before receiving the incoming OPC UA client service request:
- starting a new OPC UA server, wherein the new OPC UA server has no address spaces instantiated; and
- establishing a session with the OPC UA client.

9. A system comprising a plurality of Open Platform Communications Unified Architecture (OPC UA) servers, a plurality of OPC UA clients and a load balancer configured to redirect communication between the plurality of OPC UA servers and the plurality of OPC UA clients, characterized in that each of the plurality of OPC UA servers comprise:
- at least one processor; and
- at least one memory including instructions store thereon, which when executed by the at least one processor, cause the each of the plurality of OPC UA servers to perform the method according to claim 1.

10. A non-transitory computer-readable storage medium in which is stored a computer program product having instructions which when executed by a computing device or a system, cause the computing device or system to perform a method of dynamically managing address spaces according to claim 1.

* * * * *